Nov. 15, 1966  R. C. WUNDERLE  3,285,150
COMBINED PHOTOGRAPHIC AND DEVELOPMENT APPARATUS
Filed May 16, 1961  5 Sheets-Sheet 1

INVENTOR
Robert C. Wunderle
BY John Mahoney
ATTORNEY

Fig. 4
Fig. 5

Nov. 15, 1966    R. C. WUNDERLE    3,285,150
COMBINED PHOTOGRAPHIC AND DEVELOPMENT APPARATUS
Filed May 16, 1961    5 Sheets-Sheet 5

INVENTOR
*Robert C. Wunderle*
BY *John Mahoney*
ATTORNEY

United States Patent Office 3,285,150
Patented Nov. 15, 1966

3,285,150
COMBINED PHOTOGRAPHIC AND DEVELOPMENT APPARATUS
Robert C. Wunderle, Brooklyn, Ohio, assignor to Wunder-Phot, Inc., a corporation of Ohio
Filed May 16, 1961, Ser. No. 110,411
5 Claims. (Cl. 95—14)

The present invention relates to a combined photographic and developing apparatus including means for forming a latent image of a person, or a person and data identifying him, or a person and a check that he has tendered to a cashier for payment upon a sensitized film and for quickly developing and fixing the image upon the film from which a print or a photograph may be made. My improved apparatus may also include means for washinig the image the film after it has been developed and fixed.

In many establishments, such as in State license bureaus which grant driver licenses or in stores or shops in which photographs are taken for civil service employment, it is desirable to take a photograph of the applicant, together with data identifying him. In such cases, to eliminate waiting or the necessity of applicant making an additional trip to receive the photograph, I have provided an improved apparatus by means of which the latent image of a person, latent images of a person and data identifying him, or latent images of a person and a check that the person has tendered to a cashier for payment, may be formed upon a sensitive film and in which means are provided within the box to sever the strip of film upon which the latent image or images are formed and to quickly develop and fix the image or images upon the sensitized strip of film from which prints or photographs may be made. My improved apparatus may also include means for automatically washing the image after it has been developed and fixed. In accordance with my invention after a roll of the sensitized film has been loaded into a container in a dark room and secured to the top of a box containing the photographic and developing and fixing apparatus, by the simple actuation of a switch arranged outside of the box, a fixed image on the film may be quickly provided from which photographs may be made and consequently it is not necessary to return the sensitized film with the latent image or images thereon to a dark room for developing and fixing the image upon the film.

It is therefore an object of the present invention to provide an improved apparatus by means of which a latent image of a person or composite latent images of a person and either data identifying him or a check which he has tendered to a cashier for payment, may be made upon a sensitized film and in which means are provided for automatically severing the film and successively passing the severed film through developing and fixing baths, or through developing, fixing and washing baths, to provide a fixed image from which photographs may be made.

Another object of the invention is to provide a combined photographic and developing apparatus which is responsive to the actuation of a switch for forming a latent image of a person, or latent images of a person and data identifying him, or of a person and a check that he has presented to a cashier for payment, upon a sensitive film, for severing the film, and for successively passing the film through developing and fixing baths, or through developing, fixing, and washing baths, to provide a fixed image on the film from which photographs may be made.

A further object of my invention is to provide an improved apparatus including a substantially closed box, a container supported by the box in which a roll of sensitized film is rotatably supported, means whereby an opening may be provided between the container and the box through which the free end portion of the film may be threaded, means whereby a latent image of an object, or latent images of objects, in front of the opening may be imposed upon the sensitized film, and means arranged within the box for developing the latent image on the film and fixing it to form a fixed image on the film from which photographs may be made.

My invention will be better understood by reference to the accompanying drawings in which.

In accordance with my invention, an apparatus is provided including a box 1 which contains photographic apparatus and a container 2 which is supported upon box 1 and in which is mounted a roll of sensitized film 3. The photographic apparatus includes a small frusto-pyrmadical shaped casing 4 having a flange at its outer end which is secured around an opening in box 1 and arranged outside of box 1 is a shutter 5, an actuating stem 5a for the shutter, and a lens 6.

The container 2 which may be formed of sheet metal is constructed in such a manner that one of its side walls may be removed and the roll of film inserted in place while the container is in a dark room. As shown, flanges on the top and front and rear walls of the container extend over one side wall and are secured thereto by suitable means, such as screws, which may be removed when it is desired to insert the roll of sensitized film in place.

In preparing the apparatus for operation, the free end of the sensitized film from the roll is first drawn through aligned openings in the bottom wall of container 2 and the top wall of box 1 and is threaded between a pair of rollers 7 and 8, roller 7 being mounted on a driving shaft 9 which is driven through suitable reducing gearing by a motor 10. For securing container 2 in place upon box 1, a bolt 11 extends through aligned openings in the bottom of container 2 and a door 13 hingedly secured to box 1 and is held in place by a nut 12. The top wall of the door in turn is held in place by a bolt 13a provided with a nut 13b. Door 13 is hinged at 14 to the front wall of the box and when opened provides access to the free end portion of the film and enables it to be threaded between rollers 7 and 8. After the film has been threaded in place between rollers 7 and 8 and door 13 is closed, the inner end of casing 4 engages the sensitized film and is held in contact therewith by a pressure plate 16 which may be formed of a suitable material, such as velvet. Plate 16 in turn is held in place by a metal plate 17, the lower end of which extends into the groove of a bar 18 mounted on the bearings of shaft 9 and the shaft 19 of roller 8 and the upper end of which is secured by suitable means, such as a screw threaded to a cross bar 20. Cross bar 20, in turn, is secured by suitable means, such as glue, to braces 21 and 22 for the top wall 23 of the box. If desired, a guide 24 may be provided for directing the film between rollers 7 and 8.

When the film is in this position, shutter 5 may be opened by applying downward pressure on stem 5a of the shutter, and in the presence of light a latent image of an object or latent images of objects in front of box 1 are formed upon the sensitized film. The object may be a person or a plurality of objects may be present, such as a person and identification data or a person and a check that has been presented for payment to a cashier by the person whose photograph is being taken.

After the latent image or images have been formed upon the film, roller 7 is driven to force the sensitized film between a pair of guides 25 formed upon one arm of a Z-shaped member 26, the other arm of which is secured by suitable means, such as counter sunk screws 27, to a stationary blade 28 and to a plate 29 extending inwardly from one of the side walls. As shown, plate 29 and a plate 29a for supporting a solenoid for actuating the cutter blade which will be subsequently described, are provided with slots to receive the film and a pair of spaced strips 30 and 31 having their upper ends secured to plate 29 are provided to guide the film between rollers 32 and 33, roller 32 being driven by a shaft 34 which has a gear 35 fixed to one of its ends. When the free end of the sensitized film with the latent image or latent images thereon is caught between rollers 32 and 33, the movable blade of a cutter which is in the form of a knife 36 is actuated to sever the strip of film with the latent image or images thereon from the roll and means arranged within the closed box which is responsive to the rotation of drive shaft 34 is provided for developing and fixing the image or images upon the film.

In accordance with the present invention, container means is provided having an inner compartment for holding a developing bath and a compartment for holding a fixing bath, or if desired, the container may be provided with an additional compartment which is arranged rearwardly of the fixing compartment for holding a washing bath. The container means and the compartments therein are preferably shaped in such a manner that the amount of light that is present will be reduced to a minimum.

As shown in FIGS. 4, 6, 7 and 10, the container means is in the form of a tank 37 which is divided by partitions 38 into an inner compartment containing a developing bath 39 and an outer compartment containing a fixing bath 40. Tank 37 has front and rear walls 41 and 42, a bottom wall 43, and side walls 44 and 45 and may be composed of any suitable material, such as stainless or enameled steel, glass, hard rubber or polyethylene. For supporting rollers for passing the severed strip of film through the developing and fixing solutions, side wall extensions 46 and 47 are connected by suitable means, such as welding, to side walls 44 and 45, respectively, and may be considered part thereof. As shown more particularly in FIGS. 4 and 7, a shaft 48 extends between the side wall extensions above the partitions 38 and is provided with a roller 49 which engages a roller 50 on a shaft 51 arranged below shaft 48. A set of additional rollers 52 and 53 which are in engagement with each other are mounted on shafts 54 and 55 extending between side extensions 46 and 47 at the rear end of the tank and means is provided for forcing the strip of film through the developing bath and the fixing bath and also through the washing bath, if a compartment is provided in the tank for a washing bath, and while any suitable means may be provided for this purpose, as shown, tank 37 is slidably mounted in box 1 on a frame 56 and has a gear 57 mounted thereon which meshes with gear 35 fixed to shaft 34 when the tank is in its innermost position. Gear 57 also meshes with a gear 58 fixed to shaft 48 which drives rollers 49 and 50 when drive shaft 34 is rotated. A sprocket 59 is fixed to the opposite end of shaft 48 as shown more particularly in FIG. 10 and means, such as a chain 60, is provided to transmit motion to a sprocket 61 fixed to the shaft 54 on which roller 52 is mounted. To maintain chain 60 tight, an idler sprocket 62 is rotatably mounted on an arm 63 and the free end portion of arm 63 is provided with a slot 64 through which an adjustable stud 65 extends which is threadedly mounted in side extension 46 of the tank and is adjustable outwardly to enable arm 63 and sprocket 62 to be moved to a position in which the sprocket keeps chain 60 tight and which when tightened securely holds the arm in place.

Figures 6, 7, 8, 9:
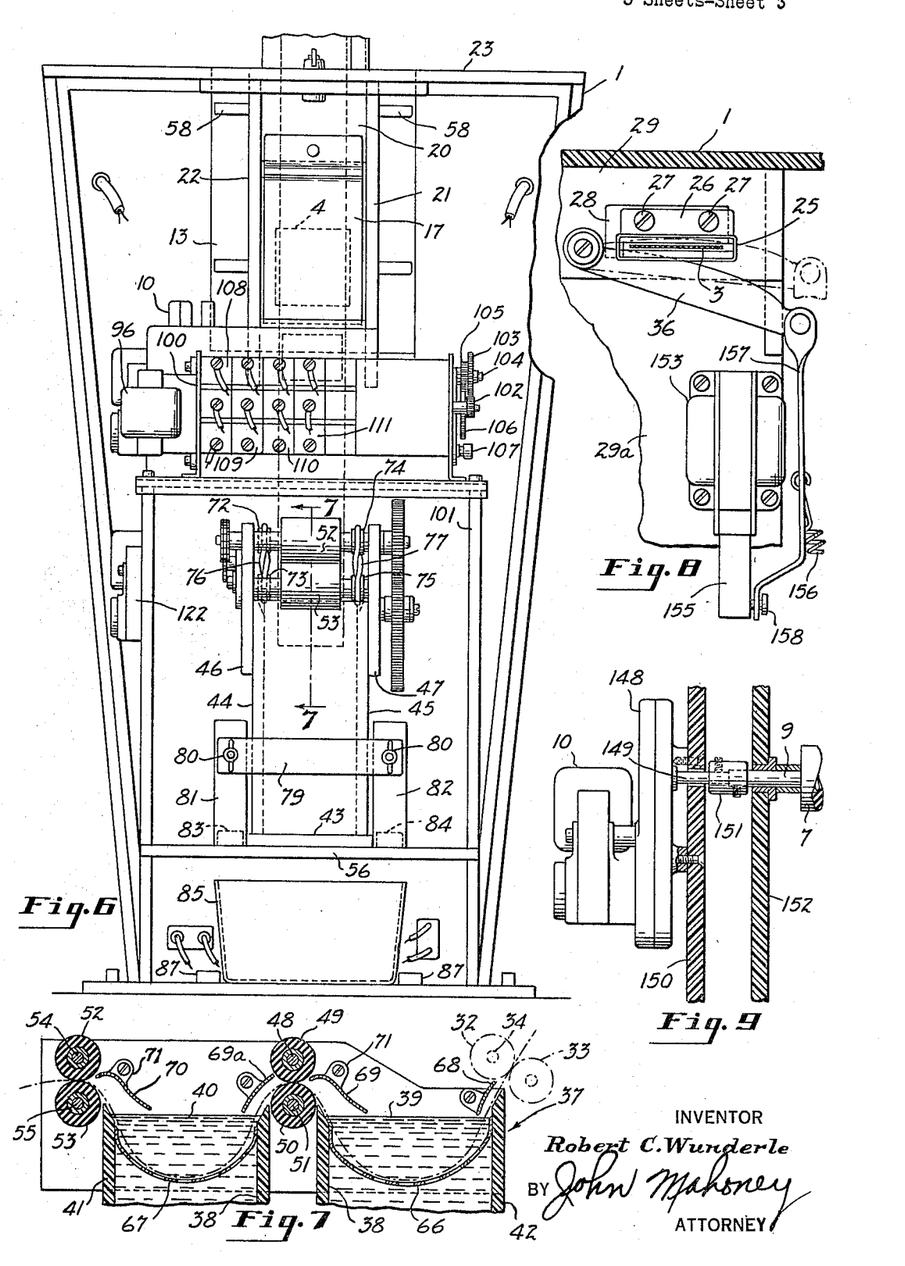
FIG. 6 is a rear view of my improved apparatus with the rear panel of the box removed.
FIG. 7 is a cross sectional view taken on a plane passing through the line 7—7 of FIG. 6, looking in the direction of the arrows and showing a tank provided with two compartments, the inner one of which contains a developing solution and the outer one a fixing solution.
FIG. 8 is an enlarged detail view of the film cutting apparatus, taken on a plane passing through the line 8—8 of FIG. 4.
FIG. 9 is a cross sectional view taken on a plane passing through the line 9—9 of FIG. 4, looking in the direction of the arrows.

Means are also provided for guiding the film during its passage through developing and fixing baths as shown in FIG. 7. For this purpose, perforated arcuate-shaped tracks 66 and 67 are arranged in the respective compartments and guides 68, 69, 69a, and 70 are provided which direct the film downwardly into engagement with track 66 and then upwardly between rollers 49 and 50 and from rollers 49 and 50 downwardly into engagement with the track 67 and then outwardly between rollers 52 and 53. Guides 68, 69, 69a, and 70 may each be provided with suitable means, such as an upwardly extending lug 71 by means of which it may be secured to one of the side extensions. After the film has passed through the fixing solution, it may be washed in any convenient manner, such as by water applied by means of a sponge, although it is within the purview of my invention to provide a tank which is not only provided with development and fixing baths but also with a washing compartment as shown more particularly in FIGS. 12 and 13 which will be subsequently described.

For providing substantially positive rotation of rollers 50, shafts 48 and 51 have pulleys 72 and 73, respectively, secured thereto and transmission means, such as a belt 76 with its central portion crossed, is trained around pulleys 72 and 73. In a like manner, a pulley 74 is fixed to shaft 54 and a pulley 75 is fixed to shaft 55 and suitable transmission means, such as a crossed belt 77, is trained around pulleys 74 and 75 to provide substantially positive rotation of roller 53.

In a broad sense, the developing bath and the fixing bath may each be formed of any suitable solution, many of which are now in commercial use, such as those disclosed in Photo Lab Index, Thirteenth Edition, published in 1953 by Morgan and Lester, 101 Park Avenue, New York 17, New York, and in claims drawn to apparatus including a development bath and a fixing bath broadly, it is to be distinctly understood that I am not to be limited to any particular bath or baths.

In accordance with my invention, however, I have provided a developing bath which will develop the latent image quickly. The developing bath I have provided may be composed of substantially the following composition in the proportions stated:

Example 1

| | | |
|---|---|---|
| Sodium sulphite | ounces | 12 to 16 |
| Hydroquinone | do | 10 to 16 |
| Potassium bromide | grams | 116 to 128 |
| Sodium hydroxide | ounces | 6 to 8 |
| Water, approximately 7 quarts. | | |

In preparing the above bath, from approximately 6 ounces to 8 ounces of sodium sulphite, 6 ounces to 8 ounces of hydroquinone, and from 58 to 64 grams of of potassium bromide, are mixed with approximately three quarts of water to provide a stock solution. From approximately 6 ounces to 8 ounces of sodium hydroxide are then added to one quart of water and approximately one part by volume of the aqueous solution of sodium hydroxide is added to two parts by volume of the stock solution. When the sodium hydroxide is dissolved in water, an exothermic reaction takes place which heats the water and when the aqueous solution of sodium hydroxide is added to the stock solution, the entire bath is raised to approximately 40° C. which temperature is sufficient to provide a rapid development of the latent image.

The following is a specific example of the developing bath:

Example 2

| | | |
|---|---|---|
| Sodium sulphite | ounces | 16 |
| Hydroquinone | do | 12 |
| Potassium bromide | grams | 116 |
| Sodium hydroxide | ounces | 6 |
| Water | quarts | 7 |

In the composition, the hydroquinone is the most important agents because it reduces the silver in the latent image from its halide to form the image. The sodium sulphite acting as a preservative to minimize the effect of aerial oxidation of the hydroquinone and the potassium bromide acts upon the unexpected silver halide crystals. If desired potassium hydroxide may be substituted for the sodium hydroxide and is to be considered equivalent thereto.

While I do not desire to be limited in this respect, I also preferably utilize a quick-acting fixing bath. For instance, I may use any one of the following baths:

Example 3

| | | |
|---|---|---|
| Water, 50° C. | ounces | 80 |
| Sodium, thiosulphate (Hypo) | pounds | 3 |
| Ammonium chloride | ounces | 6¾ |
| Sodium sulphite desiccated | do | 2 |
| Acetic acid, 28% | do | 6 |
| Boric acid crystals | do | 1 |
| Potassium alum | do | 2 |

In the above fixing solution, the sodium thiosulphate dissolves the undeveloped silver halide, the potassium alum acts as a hardening agent, the acetic acid and the boric acid provide good conditions for efficient hardening action, and the sodium sulphite prevents the sodium thiosulphate from being decomposed by the acid.

Other examples of quick acting fixing solutions are as follows:

Example 4

| | | |
|---|---|---|
| Water, 52° C. | ounces | 24 |
| Sodium thiosulphate (Hypo) | do | 10 |
| Potassium metabisulfite | grains | 365 |
| Ammonium chloride | ounce | 1 |

Example 5

| | | |
|---|---|---|
| Water, 52° C. | ounces | 24 |
| Sodium thiosulphate (Hypo) | do | 12 |
| Potassium metabisulphite | grains | 175 |
| Acetic acid, 28% | ounces | 1½ |
| Borax | grains | 290 |
| Potassium alum | ounce | ½ |

In accordance with my invention, the film in the form of a roll is placed in container 2 while the container is in a dark room with the free end of the film extending through an opening in the bottom of the container. The door 13 of box 1 is then opened and the free end of the film is threaded through an opening in the top of box 1. The free end of the film is then passed rearwardly of guide 24 and in front of pressure plate 16 and in the bite between rollers 7 and 8. The door 13 is then closed which moves the rear end of casing 4 into engagement with the film.

A developing solution 39 which is preferably of the quick acting type and particularly the composition that I have formulated is placed in the inner compartment of the tank and a fixing solution 40 which is also preferably of the quick acting type, such as one of those specified, is placed in the outer compartment. Tank 37 is then slid inwardly on frame 56 to a position in which gear 57 on side extension 47 meshes with gear 35 on drive shaft 34, a stop 78 being provided on frame 56 to prevent the gears from binding. The tank is then locked in placed by suitable means, such as a bar 79 which engages the rear end of the tank and is held in place by suitable means, such as threaded bolts supported by stanchions 81 and 82 which extend upwardly from frame 56. As shown, the bolts extend through apertures in the bar 79 and are held in place by nuts 80. Bars 83 and 84 may be provided to prevent sidewise movement of tank 37 and tank 85 is arranged below tank 37 and has one end projecting rearwardly therefrom to catch any drip from the fixing solution or from the washing solution in the event that the tank also contains a washing bath. A stop 86 on the bottom wall of the box is provided to limit inward movement of tank 85 and bars 87 are provided to limit sidewise movement thereof. A container 88 is also arranged within box 1 for holding accessories, such as the resistors and condensers, used in the electrical circuit.

When the tank 37 is in its innermost position and the sensitized film has been threaded between rollers 7 and 8, means in response to the actuation of a switch which may be located outside of box 1 is provided to impress a latent image of a person, or latent images of a person and identification data or of a person and a check that the person has presented to a cashier for payment.

Figures 1, 2, 3:
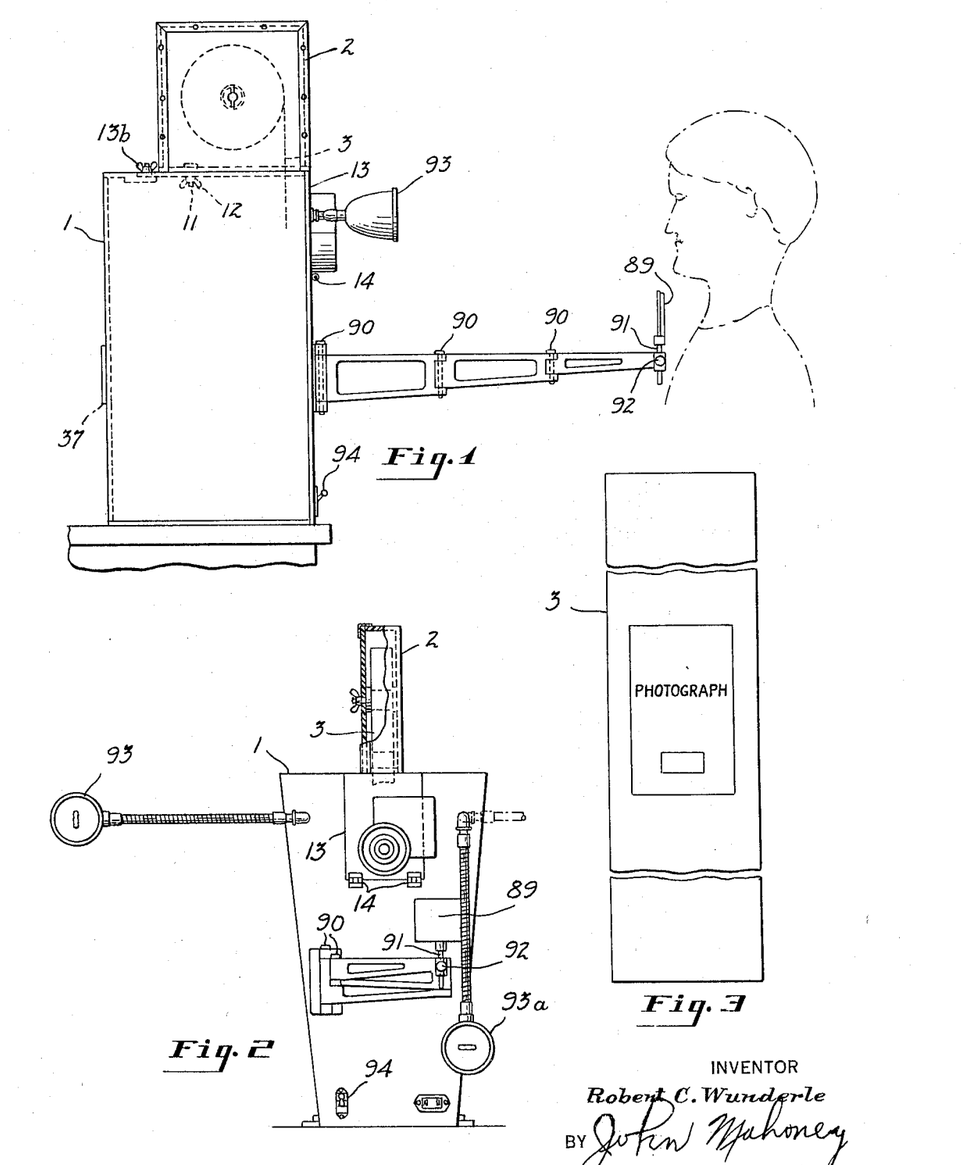
FIG. 1 is a side elevational view of my improved apparatus supported on a table, only the upper portion of which is shown, and a side elevational view of a person to be photographed and a bracket for holding data identifying the person or a check which the person to be photographed has tendered to a cashier for payment and which is also to be photographed.
FIG. 2 is a front elevational view of the apparatus, showing a pair of electronic flash bulbs mounted on the front wall, one of which is in its upper operative position and the other in its lower inactive position.
FIG. 3 is an elevational view of a strip of a sensitized film to be passed through the photographic apparatus, indicating diagrammatically the relative positions of the latent images of a person and identifying data, or the latent images of a person and a check which is formed upon the film.

As shown in FIG. 1, the person whose photograph is to be taken may stand or sit in front of box 1 and if desired identification data or a check that the person desires to cash, may be placed in the rack 89 of a sectional bracket in which the sections are pivotally connected together by pins 90. As shown, the inner section of the bracket is pivoted to the front of box 1 and the outer section terminates in a ferrule through which a rod 91 extends which supports rack 89 and which may be adjustably held in place by a set screw 92. To enable the photographic apparatus to be easily carried or shipped, the sections of the bracket may be folded upon each other to provide a compact arrangement as shown in FIG. 2.

Any convenient means may be provided to produce a source of light when a photograph is to be taken, such as an incandesent light bulb or a fluorescent lamp. Preferably a pair of electronic flash bulbs 93 and 93a are provided which may be built in to or secured to box 1 in any convenient manner. As shown, each of the bulbs is provided with an extension which is pivotally connected to the front of box 1 so that the bulbs may be moved upwardly and outwardly relative to the object or objects to be photographed when the photograph is to be taken and may be moved downwardly in front of the box when the apparatus is to be carried or shipped. Each of the electronic flash bulbs is provided with a tube containing an inert gas, such as helium, neon, argon, krypton, or zenon, or a mixture of two or more of such gases. For instance, each of the tubes may be filled with zenon at a pressure substantially below atmospheric pressure.

The apparatus is now ready for use. To start the apparatus, the switch which is designated by the numeral 94 is moved downwardly as shown in FIG. 2 and diagrammatically in FIG. 11 to establish a circuit from line $L_1$ through a conductor 95 to a motor 96 and a conductor 97 to line $L_2$. The shaft of the motor 96 is connected through suitable variable speed gears to drive a shaft 98 which in turn drives the shaft 99 of a timer. As shown, motor 96 is secured to a casing 100 which casing is supported on a frame 101 and drives the shaft 99 of the timer in any convenient manner, such as by a set of reducing gears, one of which is a cyclic change gear. As shown, a gear 102 fixed to shaft 98 meshes with cyclic change gear 103 fixed to a shaft 104 and a gear 105 is fixed to the same shaft 99 which meshes with gear 106 secured to the shaft of the timer. To vary the speed of the timer shaft, cyclic change gear 103 may be removed and replaced by another gear in which case suitable adjusting means 107 is provided to vary the position of shaft 104. The timer may be of any well known type. It may, for instance, be of a type having discs provided with cams thereon as shown more particularly in Bulletin 340, published by the Eagle Signal Company, Moline, Illinois, for actuating precision switches 108, 109, 110 and 111 as shown in FIG. 6 which are arranged adjacent to the timer and are supported by frame 101. Each of the switches is provided with an actuating blade 112, 113, 114, and 115, respectively, as shown in FIG. 11, each of which is normally biased to open position and is actuated by a cam on discs 116, 117, 118 and 119, respectively, during the rotation of the timer.

When motor 96 is energized by the closing of switch 94, it rotates the shaft 99 of the timer in the manner previously described and the cam on disc 116 moves actuating blade 112 to closed position. Switch 94 which is of the usual momentary type then opens. Motor 96, however, is still energized by a circuit established from line $L_1$ through conductor 120 and the actuating blade 112 of switch 108 to motor 96 and a second circuit is established from line $L_1$ through conductors 95 and 121 to motor 122 and from motor 122 through conductor 123 to line $L_2$. The shaft of motor 122 is connected through suitable reducing gearing, not shown, but which is similar to that shown in FIG. 9, to drive shaft 34 which drives rollers 32 and 33. The cam on disc 116 is of such arcuate extent that motor 122 is energized throughout substantially the entire rotation of the timer shaft.

When the shaft of the timer is rotated to a second limited extent, the cam on disc 119 also moves the actuating blade 115 of switch 111 to its closed position and a third circuit is established from line $L_1$ through conductor 120 to the blade 115 of switch 111 and from blade 115 through conductor 124 to the coil 125 of a solenoid and from coil 125 through conductors 126 and 97 to line $L_2$. The core 127 of the solenoid is connected to a bracket 128 and when coil 125 of the solenoid is energized and the core 127 of the solenoid is moved downwardly, it also moves bracket 128 downwardly as shown more particularly in FIG. 5. Stem 5a of the shutter is also connected to bracket 128 so that when solenoid 125 is energized shutter 5 is opened.

Figure 11:
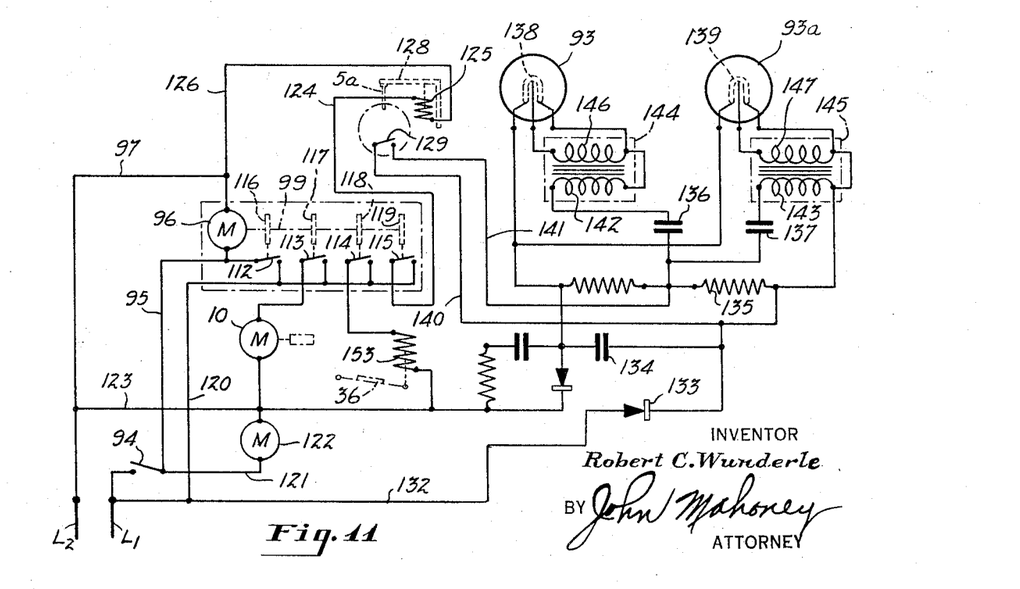
FIG. 11 is a wiring diagram illustrating the operation of my improved apparatus in response to the actuation of a switch.

As shown more particularly in FIG. 11 when the stem 5a of shutter 5 is moved downwardly, it moves a switch 129 to its closed position and means in response to the closing of the switch is provided for energizing the lighting means which as previously stated may be of any desired type. As shown diagrammatically in FIG. 11, each of the electronic flashing bulbs 93 and 93a has a tube 138 and 139, respectively, therein, and when the apparatus is to be used, the bulbs are moved upwardly and outwardly as shown by the bulb at the left in FIG. 2 and are arranged on the opposite sides of the person, or the person and the bracket which holds the identification data or a check, and means are provided to impress sufficient charge on the positive electrode of each bulb to cause a sudden flash of light through each of the tubes when the shutter is open. As shown in FIG. 11, a conductor 132 leads from line $L_1$ to a rectifier 133 but current is blocked from returning to line $L_2$ by condenser 134. The current, however, passes through resistor 135 and places a charge on condensers 136 and 137. The charges placed upon condensers 136 and 137 are not sufficient, however, to cause a discharge through the gas in tubes 138 and 139 of the respective bulbs. When stem 5a is moved downwardly to open shutter 5, however, it also actuates switch 129 to establish a circuit through conductors 140 and 141 which by-passes resistor 135 and provides sufficient current to cause the discharge of condensers 136 and 137 whereon current flows through the primary windings 142 and 143 of transformers 144 and 145 which induces sufficient high voltage current in the second windings 146 and 147 of the transformers to cause current to flow through the gas in each of the tubes 138 and 139 which produces a sudden flash of light. Resilient means, not shown, is provided to return bracket 128 to its original position when the coil 125 of the solenoid is deenergized in which case the circuit through switch 129, which is biased to its open position, is interrupted.

Upon further rotation of the timer shaft, the cam upon disc 117 closes the blade 113 of switch 109 and a circuit is established to motor 10 through conductor 120 and switch blade 113 and from motor 10 through a conductor 123 to line $L_2$. As shown more particularly in FIG. 9, the shaft of motor 10 is connected through suitable reducing gearing in casing 148 to a shaft 149 which in turn is connected to shaft 9 by a coupling 151 arranged between a frame 150 to which the gear casing 148 is secured and a second frame 152 in which a bearing is mounted for shaft 9 which drives roller 7. Roller 7 in turn drives roller 8 to feed the film having the latent image thereon downwardly in box 1 through guides 25, plates 29 and 29a and guides 30 and 31 to the bite of rollers 32 and 33 which at this time are being rotated by motor 122 which drives shaft 34. Motor 10 is energized for sufficient time and rollers 7 and 8 are rotated at sufficient speed to enable the free end of the film to be caught in the bite between rollers 32 and 33 before motor 10 is deenergized. The rotative speed of shaft 9 may, for instance, be approximately 25 r.p.m.

While the free end of the film is passing from rollers 7 and 8 to rollers 32 and 33, the shaft 99 of the timer is rotated through a sufficient arc so that the cam on disc 117 releases switch blade 113 which then opens to deenergize motor 10 and the cam on disc 118 closes the blade 114 of switch 110 to establish a circuit from line $L_1$ to switch blade 114 and from blade 114 through coil 153 of a solenoid and through conductor 123 to line $L_2$. The solenoid is supported on frame 29a and its core 155 is normally maintained in a retracted position by resilient means, such as a spring 156 having one end connected to an arm 157 and its other end connected to the casing 100 of the timer. As shown more particularly in FIG. 8, one end of arm 157 is connected to a bolt 158 extending through one end of the core and its other end is connected to blade 36. When coil 153 of the solenoid is energized, core 155 is forced inwardly against the tension of spring 156 to cause blade 36 to sever from the remainder of the roll the strip of film on which the latent image or latent images have been impressed. The cam on disc 118 then passes switch blade 114, coil 153 is deenergized, and spring 156 returns blade 36 to its open position. The cam of disc 116, however, is still in engagement with switch blade 112 and motor 122 remains energized to rotate drive shaft 33 for sufficient time to move the severed film through the development bath and the fixing bath 40, or through the developing, fixing, and washing baths. When my improved developing bath and one of the quick acting fixing baths mentioned are used, I have found it possible to obtain good prints when the severed film is passed through the developing and fixing baths, or through the developing, fixing, and washing baths, in a comparatively short period of time, such as approximately one minute or less, although I do not desire to be limited in this respect because the speed at which the severed strip of film is passed through the baths will of course be dependent upon the composition of the baths. To effect the desired speed when the film is passed through the baths within a period of one minute or less, the shaft 34 of roller 32 may be rotated at a speed of approximately twelve and one-half r.p.m.

Figure 12:
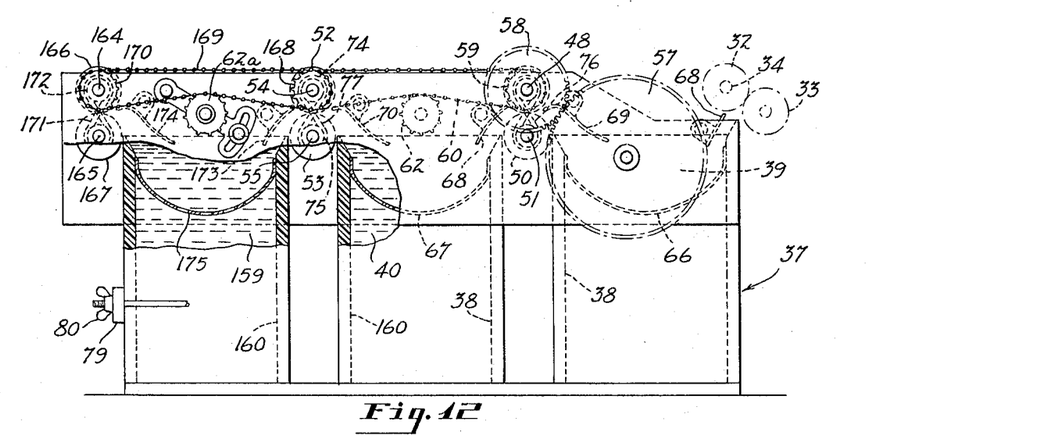
FIG. 12 is a cross sectional view of a modified form of tank.
Figure 13:
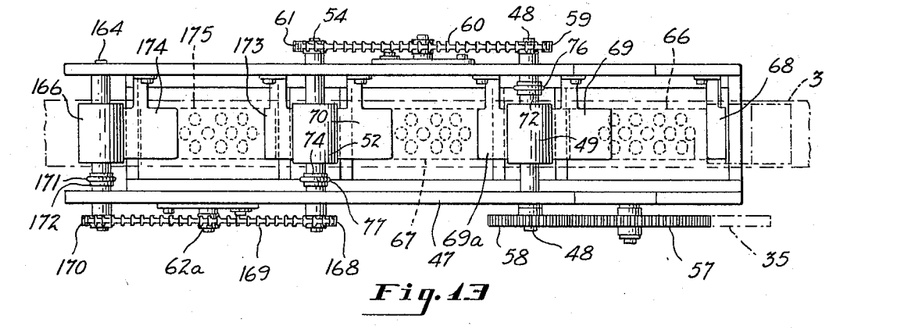
FIG. 13 is a plan view of the tank shown in FIG. 12.

While it is of course possible to wash the prints which have been developed and fixed by suitable means, such as a sponge soaked with water, or a mixture of water and a low boiling point alcohol that does not adversely affect the base of the film, such as ethyl or isopropyl alcohol, or with a mixture of water and sodium sulphite, the washing bath may be and preferably is built within the tank 37 as shown in FIGS. 12 and 13 so that the film is washed as it emerges from tank 37.

Figures 4, 5:
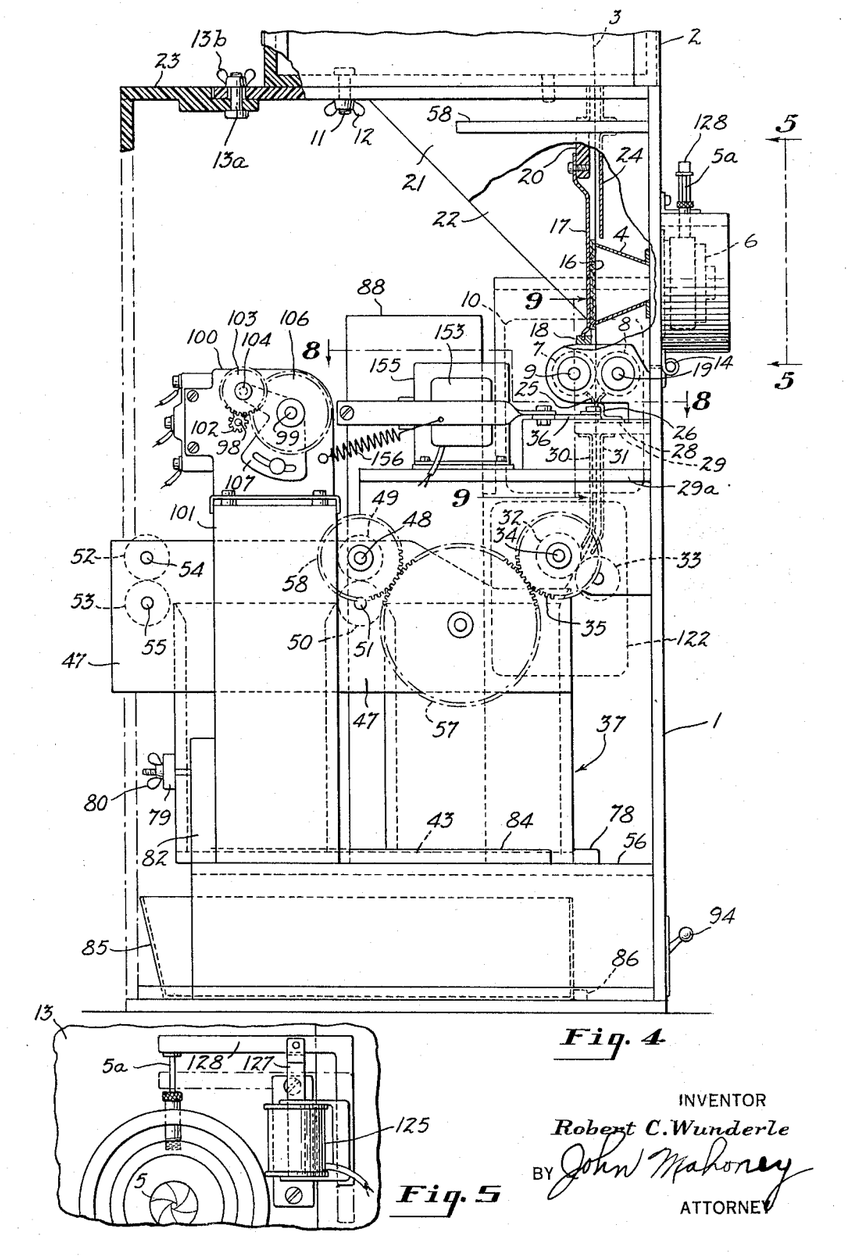
FIG. 4 is an enlarged side elevational view of the apparatus with one of the side panels removed and showing parts in section.
FIG. 5 is an elevational view as seen from a plane pasing through the line 5—5 of FIG. 4, looking in the direction of the arrows.
Figure 10:
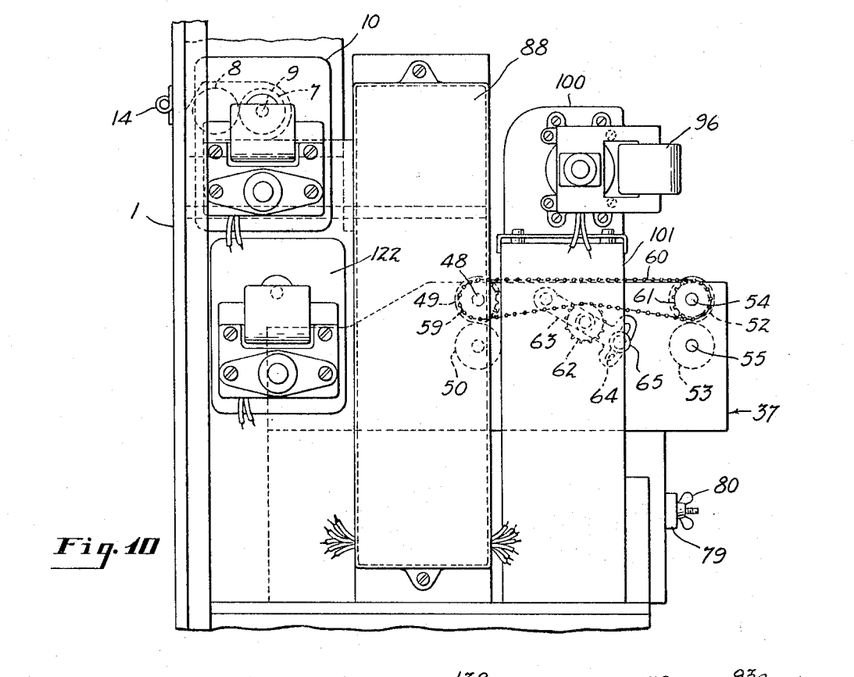
FIG. 10 is a side elevational view with parts broken away of the apparatus with one of the side panels removed.

Many of the features shown in FIGS. 12 and 13 are similar to those shown in FIGS. 4, 6 and 7 and these features have been designated by the same reference numbers. As shown in FIGS. 12 and 13, the tank 37 includes a compartment containing a developing bath, a compartment containing a fixing bath, and a compartment containing a washing bath 159. The washing bath may of course extend outwardly beyond the rear of box 1 because at that time the image is fully developed and fixed and is therefore not subject to substantial change in the presence of light. Compartment 39 may be separated from compartment 40 by partitions 38 and in a like manner compartment 159 containing the washing bath may be separated from compartment 40 containing the fixing bath by partitions 160 and when the tank is in its innermost position, it may be held in place by bar 79 having slots therein to receive bolts threaded into stanchions 81 and 82 as shown in FIG. 6 to the free end of which bolts nuts 80 arranged rearwardly of bar 79 are also threaded. When the tank is in its innermost position, gear 57 meshes with gear 58 and gear 35. As shown in FIGS. 7 and 10 and also in FIG. 12, the opposite end of shaft 48 is provided with a sprocket 59 which is connected by transmission means, such as a chain 60, to a sprocket 61 on shaft 54 to rotate roller 52. Roller 52 in turn rotates roller 53.

In the structure shown in FIGS. 12 and 13, a pair of shafts 164 and 165 are journalled in extensions 46 and 47 at the rear of the washing compartment which shafts have rollers 166 and 167 mounted thereon. For driving roller 166, shaft 54 is provided with a sprocket 168 which is connected by suitable transmission means, such as a chain 169 to a sprocket 170 secured to one end of shaft 164. To assure substantially positive rotation of roller 167, transmission means, such as a belt 171 crossed at its central portion, is trained around a pulley 172 on shaft 164 and a similar pulley on shaft 165. An idler sprocket 62a which is similar to idler sprocket 62 shown in FIG. 10 and which is adjusted in a similar manner, is provided to maintain chain 169 tight.

As in the modification shown in FIGS. 4, 6, 7 and 10, guides 68, 69, 69a and 70 are provided to direct the film over the perforated tracks 66 and 67 and additional guides 173 and 174 are provided to guide the film over a track 175 in the washing compartment and between rollers 166 and 167. It will of course be apparent that as the film passes over the perforated tracks it agitates the liquid in the respective baths and causes circulation of the liquid within the respective compartments.

The timer is so set that after the image on the film has been fixed or fixed and washed and emerges from the fixing bath or the washing bath, whichever the case may be, the cam on disc 116 of the timer passes from switch 112 which then opens to interrupt the circuit to motor 96. At this time, the shaft of the timer has passed through substantially one entire rotation. To take a photograph of another object or another object and identification data or a check, it is therefore necessary to again actuate switch 94.

What is claimed is:

1. Photographic apparatus including a substantially closed box having a front wall, means providing an opening in the front wall of said box, means whereby a strip of sensitized film may be arranged in said box opposite to said opening, a shutter for closing said opening which shutter is movable to an open position, a bracket secured to the front wall of the box for holding identification data or a check that has been tendered to a cashier for payment, said bracket being composed of sections pivotally connected together and movable inwardly toward the front wall of the box and outwardly to an extended position relative thereto, light producing means associated with the box for illuminating the person and the check or identification data, a switch, means responsive to the actuation of said switch for opening the shutter and simultaneously activating the light producing means to form latent images of the person and the check or identification data upon said film, means arranged within the box for first developing the latent images and then fixing them on said film, and means which is also responsive to the actuation of said switch for first exposing the strip of film with the latent images thereon to said development means and then to said fixing means.

2. In combination, photographic and developing apparatus including a substantially closed box having a front wall, a driving shaft mounted in said box adjacent to the front wall and having a roller thereon, a first gear fixed to one end of said driving shaft, a second shaft fixed to said box having a roller thereon which engages the roller on said driving shaft to form a first set of rollers, one end portion of a roll of sensitized film arranged in said box, a switch, means responsive to the actuation of said switch for forming a latent image on said film, for moving the free end of the film to a position between the first set of rollers, and for severing the strip of film having the image thereon from the roll, a tank slidable in said box and having side walls, said tank being provided with a first compartment containing a developing bath and a second compartment containing a fixing bath, spaced shafts extending between the side walls of said tank at a position between the first and second compartments of said tank, each of which has a roller thereon which engages the other roller and one of which has a fixed second gear thereon, a shaft secured to a side wall of said tank having a third gear mounted thereon which meshes with the second gear and the gear on the driving shaft when the tank is in its innermost position, a third pair of spaced shafts extending between side walls of the tank adjacent the rear end of the second compartment, a roller mounted on each of the third pair of shafts, a perforated track arranged in each of said compartments below the bath therein, guide means associated with said tank for directing the film downwardly upon the arcuate-shaped track in the developing bath to develop the latent image thereon and then through the second set of rollers and downwardly upon the arcuate-shaped track in the fixing bath, and then outwardly between the third set of rollers, and means which is also responsive to the actuation of said switch for rotating said drive shaft to force the strip of said film through the developing bath and then through the fixing bath.

3. In combination, photographic and developing apparatus including a closed box having a front wall, a substantially driving shaft arranged in said box adjacent the front wall and having a roller thereon, a first gear fixed to one end of the driving shaft, a second shaft fixed to said box having a roller thereon which engages the roller on said driving shaft to form a first set of rollers, one end portion of a roll of sensitized film arranged in said box, a switch, means responsive to the actuation of said switch for forming a latent image on said film, for moving the free end of the film to a position between the first set of rollers, and then severing the strip of film having the latent image thereon from the roll, a tank slidable in said box and having side walls, said tank being provided with a first compartment containing a developing bath, a second compartment containing a fixing bath, and a third compartment containing a washing bath, a second pair of spaced shafts extending between the side walls of said tank at a position between the first and second compartments of said tank, each of which has a roller thereon which engages each other, and one of which has a fixed second gear thereon, a shaft secured to a side wall of said tank having a third gear thereon which meshes with the second gear and the gear on the driving shaft when the tank is in its innermost position, a third pair of spaced shafts extending between side walls of the tank adjacent the rear end of the second compartment, a roller mounted on each of the third pair of shafts which engage each other, and a fourth pair of spaced shafts extending between the side walls of the tank adjacent the rear of the washing compartment, each of which has a roller thereon, a perforated track arranged in each of said compartments, guide means associated with said tank for directing the film through the developing bath to develop the latent image thereon, and then through the second set of rollers and downwardly upon the arcuate-shaped track in the fixing bath, and then outwardly between the third set of rollers and downwardly into the washing compartment and outwardly from the washing compartment between the rollers on the fourth set of shafts, and means which is also responsive to the actuation of said switch for rotating said shaft to force the strip of said film through the developing bath, the fixing bath, and then through the washing bath.

4. Photograph apparatus including a substantially closed box having a front wall with an opening therein, means whereby the free end portion of a roll of sensitive film is arranged in said box opposite to said opening, a shutter for closing the opening in said box which shutter is movable to an open position, a lens for directing an image of an object in front of said opening upon the sensitive film when the shutter is open, light producing means arranged adjacent to said opening, a rotatable timer arranged within said box, a tank slidable longitudinally into and from said box and having a compartment containing a developing bath and a compartment containing a fixing bath, a pair of shafts supported by said box adjacent its front wall, each of which carries a roller which engages the roller carried by the other shaft and one of which shafts has a gear fixed to one end, means responsive to the actuation of a switch for imparting rotative movement to said timer, means responsive to the rotative movement of said timer over substantially its entire arc for driving said shafts and the rollers thereon, means responsive to the rotative movement of the timer through a limited portion of its arc for opening said shutter and simultaneously activating said light producing means to form a latent image of an object opposite to said opening on said film, means responsive to the rotative movement of said timer through a second limited portion of its arc for feeding the free end of the sensitive film with the latent image thereon to a position in which it extends between the bite of said rollers, and means actuated by the timer as it reaches the end of its second limited movement for severing the portion of the film with the latent image thereon from the remainder of the film, and means including a second gear carried by said tank which meshes with the first gear when the tank is in its innermost position for forcing the severed film through the developing and fixing compartments when the tank is in its innermost position, and the means for driving the shaft carrying one of said rollers being energized for sufficient time during a single rotation of said timer for forcing the severed film with the latent image thereon through the developing bath to form an image on the film and then through the fixing bath to fix said image on the film.

5. Photographic apparatus including a substantially closed box, means providing an opening in said box, means whereby the free end portion of a roll of film is arranged in said box opposite to said opening, a shutter for closing the opening in said box which shutter is movable to an open position, a driving shaft having a first gear on one end thereof which is arranged within said box adjacent to the front wall thereof and is supported by said box, a roller mounted on said driving shaft, a shaft supported by said box having a roller thereon which engages the roller on said drive shaft, a tank slidable in a longitudinal direction into and from said box, said tank having a compartment containing a developing bath and a compartment containing a fixing bath, a series of pairs of closely arranged shafts supported by said tank, a roller supported on each shaft of each pair of shafts which rollers of each pair engage each other, a second gear mounted on the shaft of one of the tank rollers, a shaft secured to a side wall of said tank having a third gear thereon which meshes with the second gear on the tank and the gear on said driving shaft when the tank is in its innermost position and which rotates therewith, means responsive to the actuation of a switch for successively opening said shutter and forming a latent image of an object outside of the box and in front of said opening on to said film, for rotating said driving shaft to rotate the first set of rollers and the first and third gears, for moving the film with the latest image thereon within the box to a position in which the free end of the film extends between the bite of the first set of rollers, and for then severing the film with the latent image thereon, and means responsive to the rotation of said driving shaft, the gear on said tank and the sets of rollers supported by said tank for forcing the severed strip of film successively through said developing bath and then through said fixing bath when the tank is in its innermost position.

References Cited by the Examiner

UNITED STATES PATENTS

| 1,671,588 | 5/1928 | Josepho | 95—14 |
| 1,816,290 | 7/1931 | Klimis | 95—14 |
| 2,176,573 | 10/1939 | Hershberg | 95—14 |
| 2,401,185 | 5/1946 | Pratt | 95—94 |
| 2,538,270 | 1/1951 | Pratt | 95—94 |
| 2,685,831 | 8/1954 | Strandberg | 95—94 |
| 2,942,537 | 6/1960 | Zimmerman | 95—1.1 |
| 2,981,622 | 4/1961 | Chalkley | 96—48 |
| 2,981,623 | 4/1961 | Burgardt | 95—66 |
| 3,010,375 | 11/1961 | Larsson | 95—14 |
| 3,097,584 | 7/1963 | Wright | 95—14 X |

JOHN M. HORAN, *Primary Examiner.*

NORTON ANSHER, *Examiner.*